Sept. 9, 1969 J. L. FLANAGAN ET AL 3,466,547

METHOD FOR REDUCING THE DISTORTION OF MULTIPATH TRANSMISSIONS

Filed April 10, 1967

INVENTORS: J. L. FLANAGAN
R. M. GOLDEN
M. R. SCHROEDER

BY: [signature]

ATTORNEY

United States Patent Office 3,466,547
Patented Sept. 9, 1969

3,466,547

METHOD FOR REDUCING THE DISTORTION OF MULTIPATH TRANSMISSIONS

James L. Flanagan, Warren Township, Somerset County, N.J., Roger M. Golden, Costa Mesa, Calif., and Manfred R. Schroeder, Gillette, N.J., assignors to Bell Telephone Laboratories, Incorporated, Murray Hill, N.J., a corporation of New York Filed Apr. 18, 1967, Ser. No. 631,757
Int. Cl. H04b *1/10, 1/62*
U.S. Cl. 325—65 3 Claims

ABSTRACT OF THE DISCLOSURE

A replica of a signal transmitted through a transmission channel characterized by a non-minimum phase transfer function is obtained by first passing the received signal through a filter whose characteristics are the frequency inverse of those of the minimum phase component of the transfer function of the transmission channel. The resulting filtered signal is stored and passed in reverse through the all-pass component of the transfer function of the transmission channnel. A time-reversed replica of the transmitted signal is thereby obtained. A precise replica of the transmitted signal is obtained by reversing this time-reversed replica.

BACKGROUND OF THE INVENTION

This invention relates to signal processing and, in particular, to the processing of signals transmitted through transmission channels characterized by non-minimum phase transfer functions.

In a multipath transmission medium, such as a room, or sound stage, a transmitted signal reaches a receiver via several paths. The result is a "reverberant signal." Often, the reverberations are such that the original signal is of poor quality.

J. L. Flanagan, in patent application Ser. No. 583,185, filed Sept. 30, 1966, now Patent #3,417,837 and assigned to Bell Telephone Laboratories, the assignee of this application, discloses a technique, called frequency inverse filtering, for removing, in some situations, the effects of multipath transmission on the received signal. The network disclosed in Flanagan's application is stable only when the transfer function representing the multipath transmission channel is a so-called "minimum phase function," that is, when it has no "zeros" in the right-half complex $s$-plane. A function is said to have a "zero" at a complex frequency $s$ when its numerator is zero at this frequency.

In general, not all multipath transmission channels can be represented by minimum phase transfer functions. Unfortunately, when the multipath transmission channel possesses a non-minimum phase transfer function, that is, a transfer function whose numerator goes to zero for selected values of complex frequency in the right-half complex $s$-plane, thc corresponding frequency inverse filter is unstable.

SUMMARY OF THE INVENTION

This invention overcomes the instability of frequency inverse filters derived from non-minimum phase transfer functions. As a result of this invention, reverberation can be removed from a signal transmitted through a transmission channel possessing a non-minimum phase transfer function.

According to this invention, a non-minimum phase transfer function, representing for example, a multipath transmission channel, is divided into so-called minimum phase and all-pass components. As shown on page 166 of the book "Analytical Design of Linear Feedback Controls," by Newton, Gould, and Kaiser, John Wiley and Sons, Inc., 1957, the minimum phase component, by definition, contains no zeros in the right-half complex $s$-plane. The frequency inverse of this minimum phase component thus contains no "poles," that is, no zeros in its denominator, in the right-half complex $s$-plane and is therefore stable.

The all-pass component, on the other hand, contains zeros in the right-half complex $s$-plane. As the numerator of a function becomes the denominator of its inverse, the inverse of the all-pass component thus contains poles in the right - half complex $s$-plane, and is therefore unstable.

To overcome this instability, in accordance with this invention, the received signal is passed through a filter whose characteristics are the frequency inverse of those of the minimum phase component of the non-minimum phase transfer function of the transmission channel. The resulting filtered signal is recorded and the recorded signal is played backwards, thereby reversing time. This time-reversed signal, composed of the transmitted signal modified by the all-pass component of the transfer function of the transmission channel, is then passed through a filter whose characteristics are those of the all-pass component of the transfer function of the transmission channel. Reversing the time of the recorded signal is equivalent to taking the inverse of the frequency domain representation of the all-pass component of this signal. Thus, the filtering of this time-reversed signal by an all-pass filter possessing the all-pass characteristic of the transmission channel produces a time-reversed version of the transmited signal. This version is recorded and is then played backwards to yield the desired reverberation-free transmitted signal.

This invention may be more fully understood from the following detailed description taken together with the drawings.

THEORY

Figure 2:
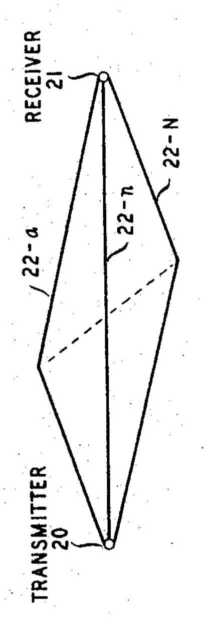
FIG. 2 is a schematic representation of a multipath transmission channel between a transmitter and a receiver.

FIG. 2 shows schematically a multipath transmission channel, represented by lines 22–*a* to 22–N linking transmitter 20 to receiver 21. N is an interger equal to the number of paths in the channel.

Figure 1C:
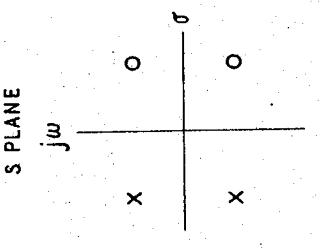
FIG. 1C shows the poles and zeros in the complex $s$-plane of the all-pass component of this transfer function.
Figure 1B:
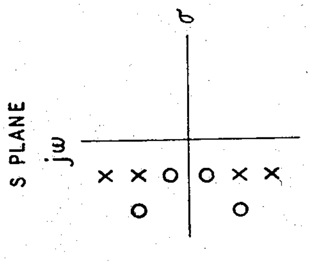
FIG. 1B shows the poles and zeros in the complex $s$-plane of the minimum phase component of this transfer function.
Figure 1A:
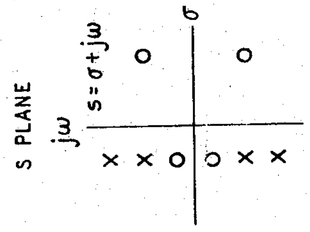
FIG. 1A shows the poles and zeros in the complex $s$-plane of the non-minimum phase transfer function of a hypothetical multipath transmission channel.

Non-minimum phase transfer functions $H(s)$ represents the frequency characteristics of this multipath transmission channel. As shown in FIG. 1A, this transfer function contains zeros, represented by 0, in the right-half complex $s$-plane. In general, $H(s)$ contains a minimum phase component $H_m(s)$, the zeros and poles of which are shown in FIG. 1B, and an all-pass component $H_{ap}(s)$, the symmetrically arranged zeros and poles of which are shown in FIG. 1C.

A transmitted signal, represented in the frequency domain as $T(s)$, is detected at receiver 21 as $R(s)$, where $$R(s)=H(s)T(s) \quad (1)$$

Equivalently, $$R(s)=H_m(s)H_{ap}(s)T(s) \quad (2)$$

According to this invention, a replica of $H_{ap}(s)T(s)$ is obtained at the receiving station by first passing $R(s)$ through a frequency inverse filter with the characteristic $H_m^{-1}(s)$. Thus $$H_{ap}(s)T(s)=H_m^{-1}(s)R(s) \quad (3)$$

But, an all-pass filter has the property that $$H_{ap}^{-1}(s)=H_{ap}(-s) \quad (4)$$

Also, as known, $$H_{ap}(-s)=\mathscr{L}\{h(-t)\} \quad (5)$$

where $h(t)$ is the impulse response of an all-pass filter with frequency domain characteristics represented by $$H_{ap}(s)$$

In addition, it is known that $$F(-s)=\mathscr{L}\{f(-t)\} \quad (6)$$

where $F(s)$ is the Laplace transform of the time dependent function $f(t)$.

Accordingly, by playing in reverse the recorded function represented by the Laplace transform $H_{ap}(s)T(s)$, the function $H_{ap}(-s)T(-s)$, equivalent to $$H_{ap}^{-1}(s)T(-s)$$

is produced. Passing this function through an all-pass filter with the frequency characteristic $H_{ap}(s)$ yields $$T(-s)$$

the time-reversed transmitted signal. Recording $T(-s)$ and playing this recording in reverse yields $T(s)$, the transmitted signal.

METHOD OF FIG. 3

Figure 3:
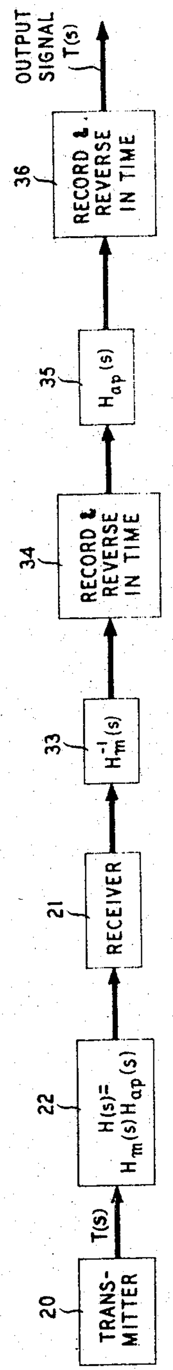
FIG. 3 illustrates schematically the method of this invention.

The processing method of this invention is illustrated in FIG. 3. Transmitter 20 produces a signal $T(s)$. Multipath transmission channel 22 has frequency characteristics represented by the product of a minimum phase component $H_m(s)$ and an all-pass component $H_{ap}(s)$. Receiver 21 detects a signal $R(s)$. The signal detected by receiver 21 is passed through filter 33, whose characteristics are the frequency inverse $H_m^{-1}(s)$ of the minimum phase component of the transfer function of the multipath transmission channel. The signal from filter 33 is recorded by recorder 34. The recorded signal is then played in reverse, effectively reversing its time axis, and sent through filter 35, whose frequency characteristics are identical to those of the all-pass component of the transfer function of the multipath transmission channel. The signal from filter 35 is recorded in recorder 36. This recorded signal is again reversed in time and the resulting signal is $T(s)$, a replica of the transmitted signal.

This description is illustrative only and other apparatus for implementing this method will be obvious to those skilled in the signal processing arts. In particular, the method of this invention is useful in obtaining a replica of a signal transmitted through any medium represented by a non-minimum phase transfer function.

What is claimed is:

1. The method of processing an input signal transmitted through a non-minimum phase transmission channel, which comprises filtering the signal received from the transmission channel with a first selected filter, to produce a first filtered signal, filtering a time reversed version of said first filtered signal with a second selected filter to produce a second filtered signal, and reversing the time scale of said second filtered signal to produce a replica of the input signal.

2. The method of producing a replica of an input signal transmitted through a transmission channel represented by a non-minimum phase transfer function, which comprises passing the signal after transmission through a filter the characteristics of which are those of the frequency inverse of the minimum phase component of the transfer function of the transmission channel, to produce a first filtered signal, passing a time reversed version of this first filtered signal through a filter the characteristics of which are those of the all-pass component of the transfer function of the transmission channel, to produce a second filtered signal, and reversing this second filtered signal in time to produce a replica of the input signal.

3. The method of processing a signal transmitted over a transmission channel characterized by a non-minimum phase transfer function, which comprises, the steps of filtering the signal received from the transmission channel with a filter the characteristics of which are those of the frequency inverse of the minimum phase component of the non-minimum phase transfer function of said channel to produce a first filtered signal, recording said first filtered signal, passing a time reversed version of said recorded, first filtered signal through a filter the characteristics of which are those of the all-pass component of said non-minimum phase transfer function, to produce a second filtered signal, recording said second filtered signal, and playing said recorded, second filtered signal in reverse to produce a replica of the signal transmitted over said channel.

References Cited

UNITED STATES PATENTS

| | | | |
|---|---|---|---|
| 2,588,915 | 3/1952 | Erikson | 179—100.1 |
| 2,657,276 | 10/1953 | Eliot et al. | 333—29 |

ROBERT L. GRIFFIN, Primary Examiner

C. R. VONHELLENS, Assistant Examiner

U.S. Cl. X.R.

179—1, 100.1, 100.2; 181—.5; 325—42, 66; 333—29